United States Patent [19]

Matsuo

[11] 4,083,519
[45] Apr. 11, 1978

[54] MANUAL RIPCORD HANDLE ASSEMBLY MOUNTING

[75] Inventor: Jon T. Matsuo, El Centro, Calif.

[73] Assignee: The United States of America as represented by the Secretary of the Navy, Washington, D.C.

[21] Appl. No.: 768,113

[22] Filed: Feb. 14, 1977

[51] Int. Cl.² .............................................. B64D 17/52
[52] U.S. Cl. .................................. 244/149; 244/151 R
[58] Field of Search ................................. 244/147–151

[56] References Cited

U.S. PATENT DOCUMENTS

| 2,095,135 | 10/1937 | Irvin | 244/149 |
|---|---|---|---|
| 2,180,182 | 11/1939 | Switlik | 244/148 |
| 2,482,693 | 9/1949 | Rogers et al. | 244/151 R |
| 2,896,885 | 7/1959 | Moy et al. | 244/149 |
| 3,154,271 | 10/1964 | Pragnell | 244/149 |

FOREIGN PATENT DOCUMENTS 537,284  6/1941  United Kingdom ............ 244/151 R

Primary Examiner—Galen L. Barefoot
Attorney, Agent, or Firm—R. S. Sciascia; G. J. Rubens

[57] ABSTRACT

Apparatus is provided for preventing premature, manual operation of a parachute activated during ejection by airload tensional forces on the parachute container and harness riser strap system, which is accomplished by slidably mounting the ripcord handle assembly with respect to the riser strap.

6 Claims, 4 Drawing Figures

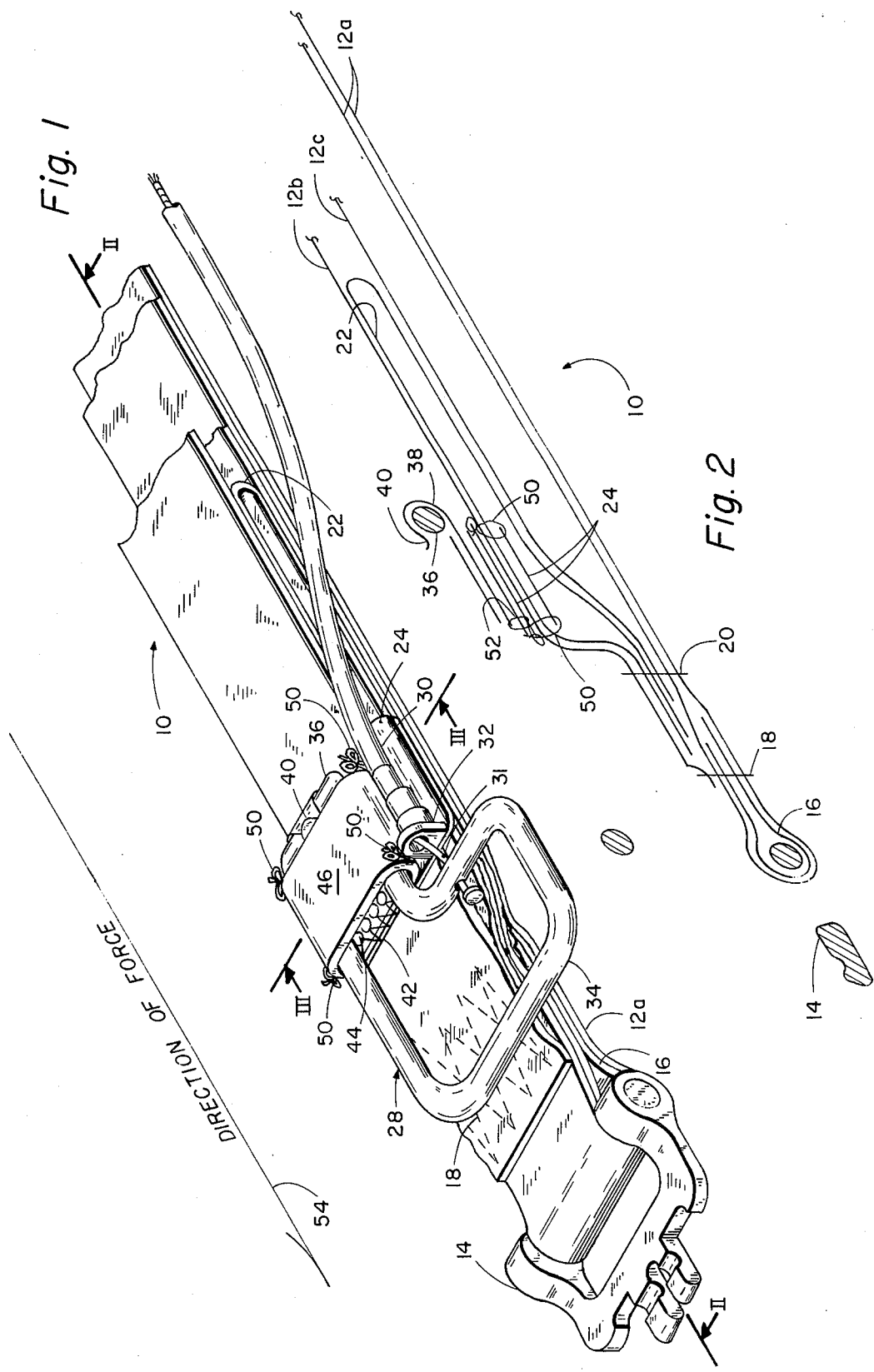

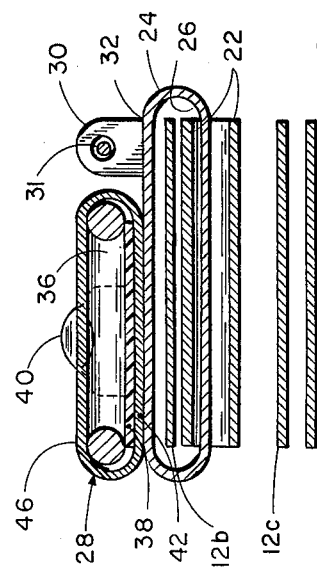
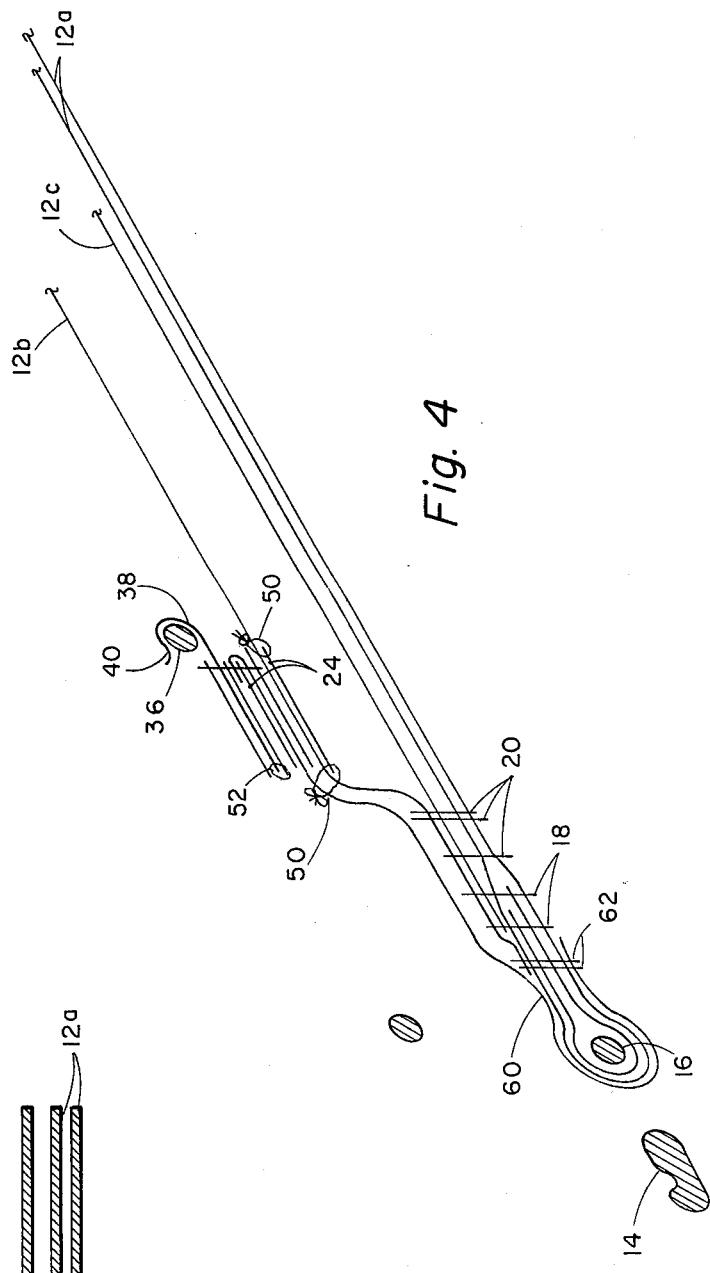

MANUAL RIPCORD HANDLE ASSEMBLY MOUNTING

BACKGROUND OF THE INVENTION

This invention relates to parachute harness construction, and more particularly to the manner of mounting the manual ripcord handle assembly on the riser straps to avoid premature manual-mode operation of the parachute after man/seat separation.

It has been the long established practice in personnel-type parachute construction to secure, i.e. by sewing, the manual ripcord handle retainer plate directly to the parachute harness riser strap. Such a construction is clearly illustrated in U.S. Pat. No. 2,896,885.

During high speed ejection and after man/seat separation, airloads caused by wind conditions, which may amount up to 1,000 pounds of force, act on the parachute container and the riser straps, especially if the straps have been loosened by the wearer to provide more maneuverability and comfort while in the cockpit. These forces can elongate the riser straps as much as 2 to 3 inches. Where the ripcord and its handle are fixed to the riser straps, as shown in the above patented construction, such elongation can cause a sufficient tension on the ripcord to prematurely open the parachute canopy, and circumvent the automatic mode of parachute opening. Premature opening can cause possible destruction of the parachute and/or injury to the parachutist.

The present invention is designed to prevent such unintentional and premature parachute deployments.

SUMMARY OF THE INVENTION

A novel means for slidably mounting the ripcord handle assembly on the parachute riser strap avoids accidental, premature parachute deployment that may otherwise accidentally occur when the ripcord handle assembly is fixedly secured to the strap.

In the present invention the conventional manual ripcord handle assembly is secured to a slidable keeper that fits loosely around and is slidable on the riser strap. The sliding keeper is releasibly secured to the riser strap by a breakcord or the like.

When a predetermined force is applied to the riser straps during parachute deployment, the physical length of the riser straps increase primarily due to stress elongation. The amount of elongation that occurs is proportional to the amount of stress or force that is applied, and realistically can be in the 2 to 3 inch range. Elongation of the riser straps will also cause elongation of the ripcord, and since the ripcord housing is anchored to the sliding keeper, the stress will cause the breakcords to part releasing the sliding keeper and permitting it to move in a direction opposite to the applied force. This longitudinal movement of the sliding keeper prevents the manual ripcord assembly from becoming elongated, as does the riser straps; thus preventing premature actuation of the manual ripcord parachute opening system.

STATEMENT OF THE OBJECTS

It is a principal object of this invention to mount a manual ripcord assembly to a harness strap in such a manner as to prevent accidental and premature parachute opening during high speed ejections by elongation of the user strap and ripcord.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a top perspective view of the lower release connector of a parachute harness riser strap showing the manner of mounting the manual ripcord handle assembly.

FIG. 2 is a longitudinal cross-sectional diagrammatic view taken along line II—II of FIG. 1.

FIG. 3 is an enlarged cross-sectional view of the manual ripcord handle assembly taken along line III—III of FIG. 1.

FIG. 4 is a longitudinal sectional view similar to FIG. 2 showing a modified sliding keeper limiting strap.

DESCRIPTION OF THE PREFERRED EMBODIMENT

Referring to the drawings where like reference numerals refer to similar parts throughout the figures there is shown in FIGS. 1 and 2 a lower end of the canopy riser strap assembly 10 of a conventional personnel-type parachute. The riser strap assembly comprises an inner basic riser strap 12a which is looped around the male half of a canopy release connector 14, as is a short chafing strap 16. Canopy release 14 is the interface between the packed parachute container (not shown) and the parachutist's harness.

A pair of outer supplemental riser straps 12b and 12c have their ends anchored to the basic riser strap 12a by thread stitching 18 and 20, respectively. Nested between riser straps 12b and 12c is a limiting strap 22 having a looped portion of predetermined and fixed length with its free ends also secured the user straps by stitching 20, and functions in a manner later to be described.

As best seen in FIG. 3, a sliding keeper 24 is constructed in the shape of a flattened sleeve having a core opening 26 of a sufficient width to longitudinally and slidably receive outer riser strap 12b and the upper half of limiting strap 22. On top of keeper 24 is supported a manual ripcord handle assembly 28 and a ripcord housing and fitting 30. A ripcord cable 31 slidably extends through housing 30 and has one free end anchored to handle assembly 28. Ripcord housing 30 has a shoulder 32 rivetted or otherwise secured to the top of keeper 24.

Ripcord handle assembly 28 comprises a rod-shaped handle 34 having a reduced end portion 36 resiliently secured by a handle retainer plate 38. Retainer plate 38 has an end clip 40 to resiliently grasp the end of handle portion 36, and a flat base portion 42 having a row of drilled openings 44 for threadably attaching the retainer plate to sliding keeper 24.

An elastic or non-elastic closed loop handle cover 46 also functions to detachably secure handle portion 36 within retainer plate chip 40. Both cover 46 and clip 40 serve to require a predetermined pull on handle 34 by the user to activate the ripcord, thereby preventing accidental opening of the parachute container.

Breakcords 52 function to secure ripcord handle assembly 28 to the top of sliding keeper 24 being accomplished by threading through handle retainer plate openings 44 the bottom half of cover 46, and openings in the top of sliding keeper 24. It should be noted in the prior art devices the handle retainer was sewn directly to the riser straps.

Breakcords 50, as best seen in FIG. 2, may be located at each corner of sliding keeper 24, and functions to detachably secure the sliding keeper to the riser strap 12b and the upper half keeper strap 22.

When the parachutist ejects, especially at high speeds, high wind forces up to 1,000 lbs. act on the various surfaces of the parachute assembly, particularly the parachute container and harness strap arrangement. These air loads cause tensional forces to be applied to the parachute riser straps in the direction of arrow 54 in FIG. 1, causing their physical length to increase by stretching. Obviously, the amount of riser strap elongation that occurs is proportional to the stress or applied force, and can be in the range of 2 to 3 inches.

Elongation of the riser straps also causes elongation of ripcord housing 30, which being bolted to sliding keeper 24 causes breakcords 50 to part. Sliding keeper 24, and the attached manual handle assembly 28, are now free to slide on straps 12b and 22 in the opposite direction from the riser pull force 54. This rearward movement of sliding keeper 24, and the manual ripcord handle on which it is attached, relieves any longitudinal stress on the ripcord and avoids premature opening of the parachute container. In the embodiment in FIGS. 1 through 3, the extent of the rearward movement of sliding keeper 24 is limited by the length of the loop in limiting strap 22.

The species of the invention illustrated in FIG. 4 differs from the species in FIGS. 1 through 3 only in the construction of the means for limiting the rearward movement of sliding keeper 24. In lieu of the fixed length of looped strap 22 in FIGS. 1 through 3, a single length of stretchable, bungee strap 60 is employed. One end of the bungee strap 60 is sewn at 62 around the pin of canopy release 14, and the other end is extended through sliding keeper 24 and secured on the top thereof. By using a resilient limiting strap 60, sliding keeper 24 and its attached ripcord assembly 28 will return to its initial position after the stress in the riser straps has been relieved.

The novel invention described hereto provides a technique for preventing premature manual-mode parachute opening, particularly at high speed ejection, caused by the elongation of the manual ripcord assembly from the high stress forces exerted on the riser strap. Premature parachute opening at high speeds circumvents automatic parachute deployment and can cause parachute destruction and/or injury to the parachutist.

Obviously many modifications and variations of the present invention are possible in the light of the above teachings. It is therefore to be understood that within the scope of the appended claims the invention may be practiced otherwise than as specifically described.

What is claimed is:

1. In combination with a parachute harness riser strap, and a manual ripcord handle and cable assembly supported thereon comprising:

retainer means for releasably securing the ripcord handle and associated ripcord cable;

a keeper sleeve loosely mounted around the strap to be readily slidable thereon;

said retainer means secured to the keeper;

a ripcord cable assembly secured to the keeper;

breakable means having a predetermined breaking strength for detachably securing the keeper to said riser strap to prevent sliding of said keeper, whereby excessive elongation of said strap and said ripcord cable assembly caused by an applied tension will cause the breakable means to part and enable the keeper sleeve and the ripcord handle and cable assembly attached thereto to slide freely on the strap and relieve said ripcord cable of said tension that may cause premature opening of the parachute.

2. The ripcord assembly of claim 1 wherein means are provided for limiting the amount of keeper movement on said riser strap.

3. The ripcord assembly of claim 2 wherein said limiting means is a looped strap positioned between the riser straps and extending through the keeper.

4. The ripcord assembly of claim 2 wherein said limiting means is a single resilient strap.

5. The ripcord assembly of claim 2 wherein said breakable means are break cords attached to opposite ends of the keeper.

6. A slidable manual ripcord cable and handle mounting assembly for a parachute harness strap subject to a tensional force comprising: p1 a sleeve-like keeper member loosely receiving the harness strap to be slidable therethrough;

means for securing the keeper member to the harness strap to prevent sliding of said keeper, said securing means detachable upon the application of a predetermined tension on the ripcord cable;

means for mounting the ripcord cable and handle assembly to the top of said keeper;

means for limiting the extent of movement of the keeper on the strap;

whereby a predetermined tensional force on the ripcord cable will detach the keeper and allow the ripcord cable and handle assembly to slide with the keeper along said strap to the extent allowed by the limiting means.

* * * * *